United States Patent [19]

Durivage, III

[11] Patent Number: 5,038,246

[45] Date of Patent: Aug. 6, 1991

[54] FAULT POWERED, PROCESSOR CONTROLLED CIRCUIT BREAKER TRIP SYSTEM HAVING RELIABLE TRIPPING OPERATION

[75] Inventor: Leon W. Durivage, III, Marion, Iowa

[73] Assignee: Square D Company, Palatine, Ill.

[21] Appl. No.: 403,225

[22] Filed: Aug. 31, 1989

[51] Int. Cl.[5] .............................................. H02H 3/08
[52] U.S. Cl. ......................................... 361/93; 361/88
[58] Field of Search ....................... 361/86, 87, 88, 93, 361/65; 364/483

[56] References Cited

U.S. PATENT DOCUMENTS

| | | | |
|---|---|---|---|
| 4,121,269 | 10/1978 | Hobson | 361/44 |
| 4,208,693 | 6/1980 | Dickens et al. | 361/94 |
| 4,331,997 | 5/1982 | Engel et al. | 361/93 |
| 4,331,998 | 5/1982 | Matsko et al. | 361/93 |
| 4,331,999 | 5/1982 | Engel et al. | 361/94 |
| 4,335,413 | 6/1982 | Engel et al. | 361/93 |
| 4,335,437 | 6/1982 | Wilson et al. | 364/483 |
| 4,338,647 | 7/1982 | Wilson et al. | 361/96 |
| 4,351,012 | 9/1982 | Elms et al. | 361/96 |
| 4,351,013 | 9/1982 | Matsko et al. | 361/96 |
| 4,377,836 | 3/1983 | Elms et al. | 361/96 |
| 4,377,837 | 3/1983 | Matsko et al. | 361/105 |
| 4,419,619 | 12/1983 | Jindrick et al. | 323/257 |
| 4,428,022 | 1/1984 | Engel et al. | 361/96 |
| 4,476,511 | 10/1984 | Saletta et al. | 361/96 |
| 4,535,409 | 8/1989 | Jindrick et al. | 364/481 |
| 4,550,360 | 10/1985 | Dougherty | 361/93 |
| 4,631,625 | 12/1986 | Alexander et al. | 361/94 |
| 4,680,706 | 7/1987 | Bray | 364/492 |
| 4,682,264 | 7/1987 | Demeyer | 361/96 |
| 4,689,712 | 7/1987 | Demeyer | 361/96 |
| 4,706,155 | 11/1987 | Durivage et al. | 361/64 |
| 4,709,339 | 11/1987 | Fernandes | 364/492 |
| 4,717,985 | 1/1988 | Demeyer | 361/96 |
| 4,747,061 | 5/1988 | Lagree et al. | 364/483 |
| 4,783,748 | 11/1988 | Swarztrauber | 364/483 |
| 4,794,369 | 12/1988 | Haferd | 341/166 |
| 4,803,635 | 2/1989 | Andow | 364/483 |
| 4,849,848 | 7/1989 | Ishii | 361/93 |

OTHER PUBLICATIONS

General Electric Publication GEH-4291, 7-1880.

Primary Examiner—Derek S. Jennings
Attorney, Agent, or Firm—Larry I. Golden; Jose W. Jimenez; A. Sidney Johnston

[57] ABSTRACT

A fault-powered, processor-based tripping system includes a solenoid for interrupting a current path in response to a trip signal generated by a processor. The processor analyzes current provided by a current sensor, by way of an interface circuit, to determine when the trip signal should be generated. A power supply provides a reference signal to the processor to indicate the amount of power it is capable of delivering to the solenoid. Before attempting to engage the solenoid, the processor checks the level of the reference signal to determine whether or not the power supply is at that time capable of supplying the solenoid with a sufficient amount of power to effect interruption of the current path thereby avoiding a power loss by inappropriate engagement of the solenoid. If the power level is sufficient to engage the solenoid, the processor generates the trip signal to interrupt the current path.

9 Claims, 10 Drawing Sheets 5,038,246

FAULT POWERED, PROCESSOR CONTROLLED CIRCUIT BREAKER TRIP SYSTEM HAVING RELIABLE TRIPPING OPERATION

TECHNICAL FIELD

The present invention relates generally to circuit breakers, and, more particularly, to processor controlled trip arrangements for circuit breakers.

BACKGROUND ART

Trip systems are designed to respond to power faults detected in circuit breakers. Most simple trip systems employ an electromagnet to trip the circuit in response to short circuit or overload faults The electromagnet provides a magnetic field in response to the current flowing through the breaker. When the current level increases beyond a predetermined threshold, the magnetic field "trips" a mechanism which causes a set of circuit breaker contacts to release, thereby "breaking" the circuit path.

Many simple trip systems also employ a slower responding bi-metallic strip, which is useful for detecting a more subtle overload fault. This is because the extent of the strip's deflection represents an accurate thermal history of the circuit breaker and, therefore, even slight current overloads. Generally, the heat generated by the current overload will cause the bi-metallic strip to deflect into the tripping mechanism to break the circuit path.

The tripping systems discussed above are generally adequate for many simple circuit breaker applications, but there has been an increasing demand for a more intelligent and flexible tripping system. For example, many factories today include 3-phase power equipment which is often replaced or moved on a regular basis. Consequently, the circuit breaker tripping specifications, e.g., current thresholds, for that equipment must be adjusted Thus, processor-based tripping systems have been developed to provide user-programmable flexibility.

While adding flexibility, processor-based tripping systems have interrupted the current path in response to power faults using techniques that are inaccurate or unreliable under certain conditions. For example, processor based systems that are fault powered, i.e., powered from the current flowing through the circuit breaker, usually employ a solenoid to break the circuit breaker current path. Typically, it is only after a power fault is detected in the current path that the processor attempts to engage the solenoid. However, after a power fault, system power is sometimes insufficient to successfully engage the solenoid. Not only might the attempted engagement fail, it will further dissipate system power.

Prior art systems have avoided such reliability problems by including a separate power supply which is not susceptible to faults. Unfortunately, a separate power supply is not acceptable in many applications due to cost and maintenance problems.

SUMMARY OF THE INVENTION

In accordance with a preferred embodiment of the present invention, a fault powered tripping system includes a solenoid for interrupting the current path in response to a trip signal generated by a processor. The processor analyzes current provided by a current sensor, by way of an interface circuit, to determine when the trip signal should be generated. A power supply provides a reference signal to the processor to indicate the amount of power it is capable of delivering to the solenoid. Before attempting to engage the solenoid, the processor checks the level of the reference signal to determine whether or not the power supply is at that time capable of supplying the solenoid with a sufficient amount of power to effect interruption of the current path thereby avoiding a power loss by inappropriate engagement of the solenoid. If the power level is sufficient to engage the solenoid, the processor generates the trip signal to interrupt the current path.

BRIEF DESCRIPTION OF THE DRAWINGS

Other objects and advantages of the invention will become apparent upon reading the following detailed description and upon reference to the accompanying drawings, in which:

FIG. 3b is a flow chart illustrating a manner in which a display processor 316 of FIG. 3a may be programmed to control an LCD display 322 of FIG. 3a;

Figure 1:
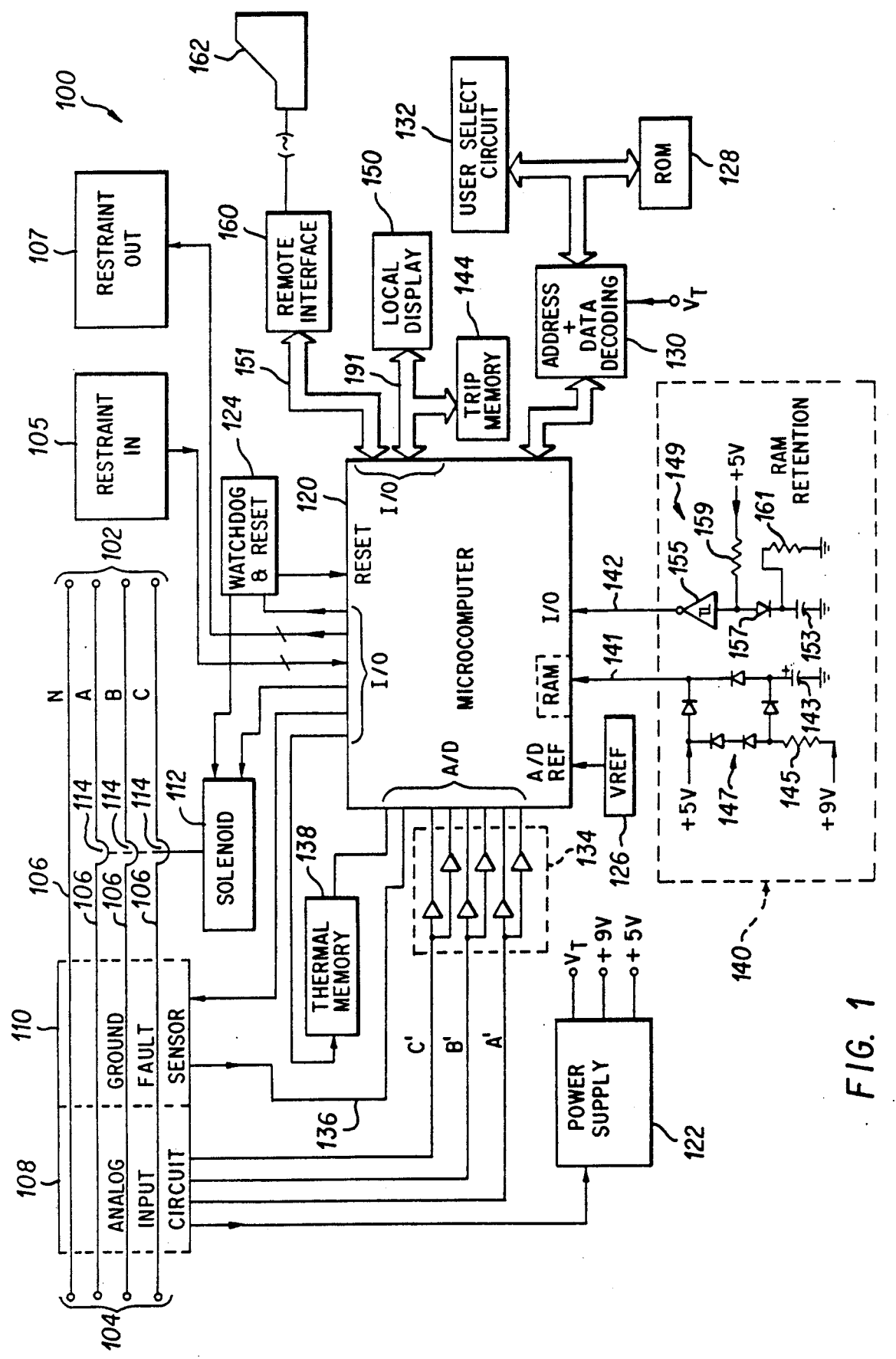
FIG. 1 is a block diagram of a microprocessor based circuit breaker tripping system, according to the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

BEST MODES FOR CARRYING OUT THE INVENTION

System Overview:

The present invention has direct application for monitoring and interrupting a current path in an electrical distribution system according to specifications that may be programmed by the user. While any type of current path would benefit from the present invention, it is particularly useful for monitoring and interrupting a three phase current path.

Turning now to the drawings, FIG. 1 shows a block diagram of an integral microprocessor controlled tripping system 100 for use with a three-phase current path on lines 106 having source inputs 102 and load outputs 104. The tripping system 100 uses an analog input circuit 108 and a ground fault sensor 110 to detect three-phase current on the current path 106. When the tripping system detects an overload, short circuit or ground fault condition, or otherwise determines that the current path should be interrupted, it engages a solenoid 112 which trips a set of contactors 114 to break the current path carrying phases A, B and C. Consequently, any ground-fault circuit through the earth ground path or through an optional neutral line (N) is also broken.

The tripping system 100 of FIG. 1 utilizes a number of circuits to determine when the current path should be interrupted. This determination is centralized at a microcomputer 120, preferably an MC68HC11A1, which is described in *MC68HC11HCMOS Sinole Chip Microcomputer Proqrammer's Reference Manual*, 1985 and *MC68HC11A8 Advance Information HCMOS Single Chip Microcomputer*, 1985, all being available from Motorola, Inc., Schaumburg, Ill. Peripheral circuits that support the microcomputer 120 include a reset circuit 124 that verifies the sanity of the tripping system 100, a voltage reference circuit 126 that provides a stable and reliable reference for analog to digital (A/D) circuitry located within the microcomputer 120, ROM 128 that stores the operating instructions for the microcomputer 120, and a conventional address and data decoding circuit 130 for interfacing the microcomputer 120 with various circuits including the ROM 128 and a user select circuit 132 The address and data decoding circuit 130, for example, includes an address decoder part No. 74HC138, and an eight-bit latch, part No. 74HC373, to latch the lower eight address bits which are alternately multiplexed with eight data bits in conventional fashion. The ROM, for example, is part No. 27C64. The user select circuit 132 allows the user to designate tripping characteristics for the tripping system 100, such as overload and phase imbalance fault conditions.

The tripping system 100 is operatively coupled with a conventional electrical distribution system (not shown) through input and output restraint circuits 105 and 107. Signals received from the input restraint circuit 105 indicate that a downstream circuit breaker is in an overload (or over current) condition. The output restraint circuit 107 is used to send signals to upstream circuit breakers to indicate the status of its own and all downstream circuit breaker conditions. In general, the tripping system 100 will delay tripping of the contactors 114 when a downstream breaker is in an overload (or over current) condition, assuming that the downstream circuit breaker opens and clears the condition. Otherwise, the tripping system 100 should not delay tripping of the contactors 114. For further detail regarding restraint-in/restraint-out electrical distribution systems, reference may be made to U.S. Pat. No. 4,706,155 to Durivage et al.

Other circuits are used along with the above circuits to provide reliability and integrity to the tripping system 100. For instance, the microcomputer 120 utilizes the analog input circuit 108 along with a gain circuit 134 to measure precisely the RMS (Root Mean Squared) current on each phase of the lines 106. The accuracy of this measurement is maintained even in the presence of non-linear loads.

The analog input circuit 108 develops phase signals A', B' and C' that are representative of the current on lines 106. The gain circuit 134 amplifies each phase signal A', B' and C' through respective dual gain sections, from which the microcomputer 120 measures each amplified signal using its A/D circuitry. By providing two gain stages for each signal A', B' and C', the microcomputer 120 can immediately perform a high gain or low gain measurement for each current phase depending on the resolution needed at any given time.

The analog input circuit 108 is also utilized to provide a reliable power source to the tripping system 100. Using current developed from the lines 106, the analog input circuit 108 operates with a power supply 122 to provide three power signals (VT, +9 v and +5 v) to the tripping system 100. The power signal VT is monitored by the microcomputer 120 through decoding circuit 130 to enhance system dependability.

System dependability is further enhanced through the use of a thermal memory 138 which the microcomputer 120 interacts with to simulate a bi-metal deflection mechanism. The thermal memory 138 provides an accurate secondary estimate of the heat in the tripping system 100 in the event power to the microcomputer 120 is interrupted.

The ground fault sensor 110 is used to detect the presence of ground faults on one or more of the lines 106, and to report the faults to the microcomputer 120. Using user selected trip characteristics, the microcomputer 120 determines whether or not the ground fault is present for a sufficient time period at a sufficient level to trip the contactors 114. The microcomputer 120 accumulates the ground fault delay time in its internal RAM. A RAM retention circuit 140 is used to preserve the ground fault history for a certain period of time during power interruptions.

The RAM retention circuit 140 exploits the built-in capability of the microcomputer 120 to hold the contents of its internal RAM provided that an external supply voltage is applied to its MOPDB/Vstby input 141. This external supply voltage is stored on a 150 microfarad electrolytic capacitor 143 that is charged from the +9 volt supply through a 6.2K ohm resistor 145. The capacitor 143 is charged from the +9 volt supply, and clamped by diodes to the +5 volt supply, so that the capacitor will be rapidly charged during power-up.

The ground fault delay time stored in internal RAM becomes insignificant after a power interruption that lasts longer than about 3.6 seconds. To test whether such an interruption has occurred, the RAM retention circuit 140 includes an analog timer 149 having a resistor 161 and a capacitor 153 establishing a certain time constant, and a Schmitt trigger inverter 155 sensing whether the supply of power to the microcomputer 120 has been interrupted for a time sufficient for the capacitor 153 to discharge. Shortly after the microcomputer reads the Schmitt trigger 155 during power-up, the capacitor 153 becomes recharged through a diode 157 and a pull-up resistor 159. Preferred component values, for example, are 365 K ohms for resistor 161, 10 microfarads for capacitor 153, part No. 74HC14 for Schmitt trigger 155, 1N4148 for diode 157, and 47K ohms for resistor 159.

Another important aspect of the tripping system 100 is its ability to transfer information between itself and the user. This information includes the real-time current and phase measurements on the lines 106, the system configuration of the tripping system 100 and information relating to the history of trip causes (reasons why the microcomputer 120 tripped the contactors 114). As discussed above, the real-time line measurements are precisely determined using the analog input circuitry 108 and the gain circuit 134. The system configuration of the tripping system 100 and other related information is readily available from ROM 128 and the user select circuit 132. The information relating to the history of trip causes is available from a nonvolatile trip memory 144. Information of this type is displayed for the user either locally at a local display 150 or remotely at a conventional display terminal 162 via remote interface 160. To communicate with the display terminal 162, the tripping system utilizes an asynchronous communication interface, internal to the microcomputer 120. Using the MC68HC11, the serial communications interface (SCI) may be utilized.

Figure 2:
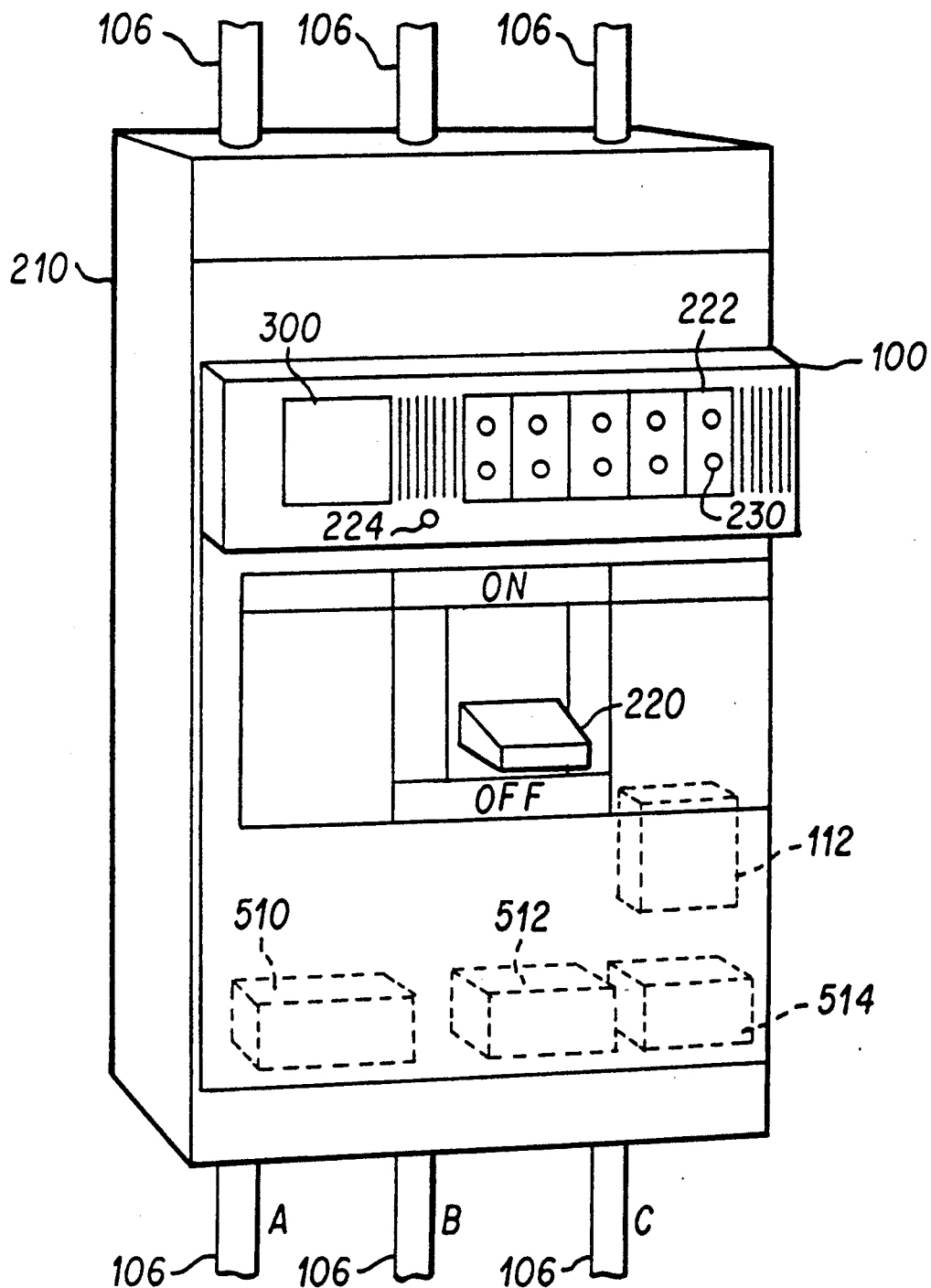
FIG. 2 is a perspective view of the circuit breaker tripping system as set forth in the block diagram of FIG. 1.

FIG. 2 is a perspective view of the tripping system 100 as utilized in a circuit breaker housing or frame 210. The lines 106 carrying phase currents A, B and C are shown passing through line embedded current transformers 510, 512 and 514 (in dashed lines) which are part of the analog input circuit 108. Once the solenoid 112 (also in dashed lines) breaks the current path in lines 106, the user reconnects the current path using a circuit breaker handle 220.

Except for the circuit breaker handle 220, the interface between the tripping system 100 and the user is included at a switch panel 222, an LCD display panel 300 and a communication port 224. The switch panel 222 provides access holes 230 to permit the user to adjust binary coded decimal (BCD) dials (FIG. 8) in the user select circuit 132. The communication port 224 may be used to transfer information to the display terminal 162 via an optic link (not shown).

In the following sections, the tripping system 100 is further described in detail.

A. Local Display

Figure 3A:
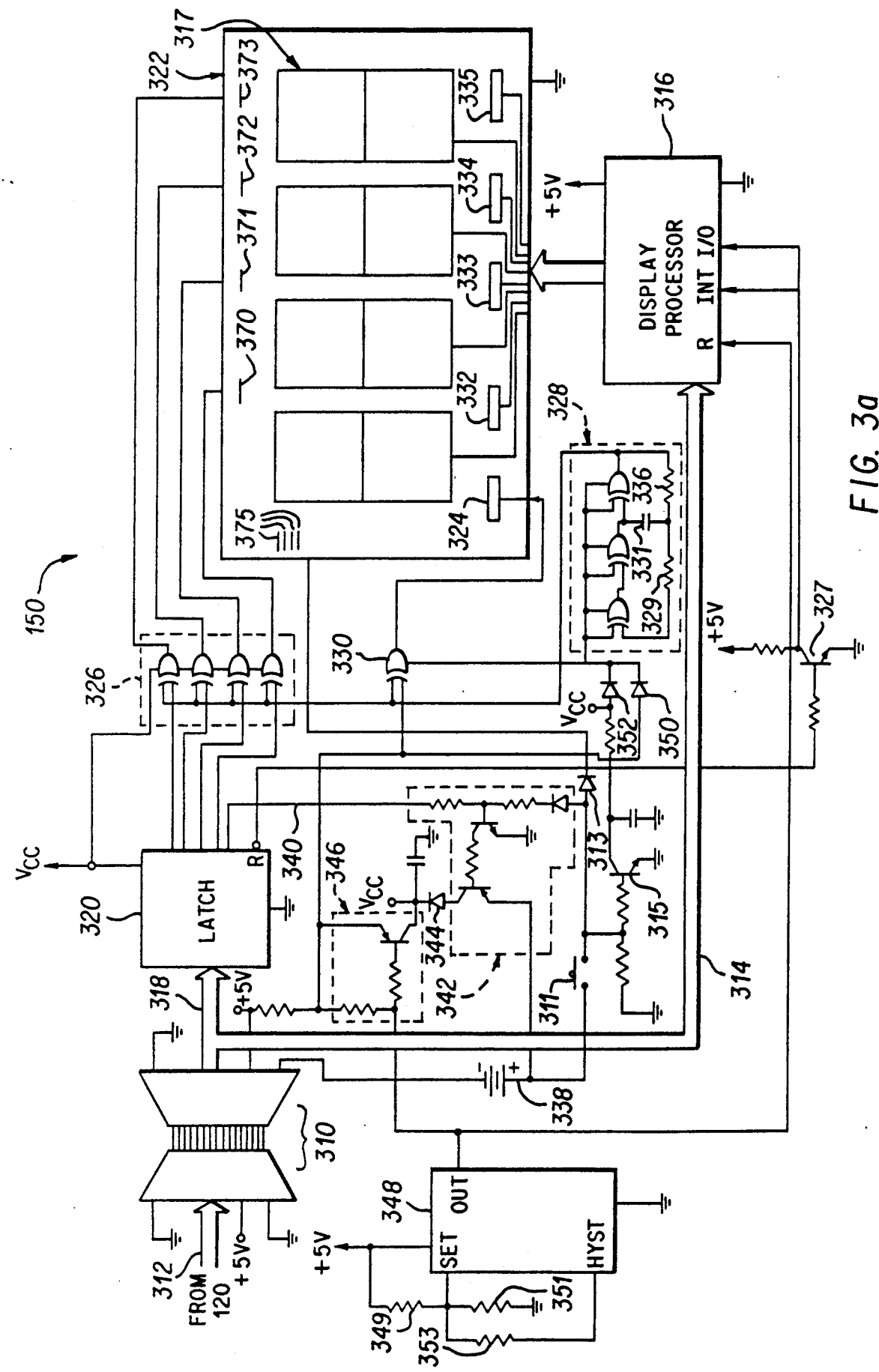
FIG. 3a a diagram illustrating a local display 150 of FIG. 1.

FIG. 3a is a schematic diagram of the local display 150 of FIG. 1. The local display 150 is physically separated from the remaining portion of the tripping system 100, but coupled thereto using a conventional connector assembly 310. The connector assembly 310 carries a plurality of communication lines 312 from the microcomputer 120 to the local display 150. These lines 312 include tripping system ground, the +5 V signal from the power supply 122, serial communication lines 314 for a display processor 316, and data lines 318 for a latch 320. The data lines 318 include four trip indication lines (overload, short circuit, ground fault and phase unbalance) which are clocked into the latch 320 by yet another one of the lines 318.

An LCD display 322 displays status information provided by the latch 320 and the display processor 316. Different segments of the LCD display 322 may be implemented using a variety of devices including a combination static drive/multiplex custom or semi-custom LCD available from Hamlin, Inc., Lake Mills, Wis. For additional information on custom or semi-custom displays, reference may be made to a brochure available from Hamlin, Inc. and entitled *Liquid Crystal Display*.

The latch 320 controls the segments 370-373 to respectively indicate the trip conditions listed above. Each of these segments 370-373 is controlled by the latch 320 using an LCD driver circuit 326 and an oscillator circuit 328. The corresponding segment 370-373 illuminates when the associated output signal from the latch 320 is at a logic high level.

The display processor 316 controls four seven-segment digits 317 as an ammeter to display the current in the lines 106. The display processor 316, for example, is an NEC part No. UPD7502 LCD Controller/Driver which includes a four-bit CMOS microprocessor and a 2k ROM. This NEC part is described in *NEC UPD7501/02/03 CMOS 4-Bit Single Chip Microprocessor User's Manual*, available from NEC, Mountain View, Ca. Other segments 375 of the LCD display 322 may be controlled by the display processor 316 or by other means to display various types of status messages.

For example, a push button switch 311 may be utilized to test a battery 338. To perform this test, the battery 338 is connected through a diode 313 to one of the segments 375 so that when the switch 311 is pressed, the condition of the battery is indicated. The push-button switch 311 preferably resets the latch 320 when the switch is depressed. For this purpose the switch 311 activates a transistor 315. The latch, for example, is a 40174 integrated circuit.

Additionally, the switch 311 may be used to select the phase current to be displayed on the LCD display 322 to control segments 375 such that they identify the phase current (A, B, C or N) on lines 106 being displayed on the four seven-segment digits 317. For this purpose the switch 311 activates a transistor 327 to invert a signal provided from the battery and to interrupt the display processor 316. Each time the display processor 316 is interrupted, the phase current that is displayed changes, for example, from phase A to B to C to ground fault to A, etc.

An optional bar segment 324 is included in the LCD display 322 to indicate a percentage of the maximum allowable continuous current in the current path. The bar segment 324 is controlled by the +5 V signal via a separate LCD driver 330. The LCD driver 330 operates in conjunction with the oscillator circuit 328 in the same manner as the LCD driver 326. However, the LCD driver 330 and the oscillator circuit 328 will function at a relatively low operating voltage, approximately two to three volts. An MC14070 integrated circuit, available from Motorola, Inc., may used to implement the LCD drivers 330 and 326. Thus, when the tripping system fails to provide the display processor 316 with sufficient operating power (or current), the LCD driver 330 is still able to drive the bar segment 324. The LCD driver 330 drives the bar segment 324 whenever the tripping system detects that less than about 20% of the rated trip current is being carried on lines 106 to the load.

As an alternative embodiment, the bar segment 324 may be disabled by disconnecting the LCD driver 330.

Additional bar segments 332-335 are driven by the display processor 316 to respectively indicate when at least 20-40%, 40-60%, 60-80% and 80-100% of the rated trip current is being carried on lines 106 to the load.

The oscillator 328 also uses part No. MC14070 in a standard CMOS oscillator circuit including resistors 329, 336 and a capacitor 331 that have values, for example, of 1 megohm, 1 megohm, and 0.001 microfarads, respectively.

Even when a power fault causes the system to trip and interrupt the current on lines 106, the local display is still able to operate on a limited basis. This sustained operation is performed using the battery 338 as a secondary power source. The battery, for example, is a 3 to 3.6 volt lithium battery having a projected seventeen year life. The battery 338 supplies power to portions of the local display 150 only when two conditions are present: (1) the latch 320 has received a trip signal from the microcomputer 120 (or the test switch 311 is activated), and (2) the output voltage level of the +5 V power supply is less than the voltage level from the battery 338. When the latch 320 latches in any one of the four trip indication lines from the data lines 318, a control signal is generated on a latch output line 340. The control signal turns on an electronic switch 342 which allows the battery 338 to provide power at Vcc so long as a diode 344 is forward biased.

The diode 344 is forward biased whenever the second condition is also present. Thus, when the output voltage level of the +5 V power supply is less than the voltage level from the battery 338, the diode 344 is forward biased and the battery 338 provides power to the local display 150. In addition, the diode 344 is forward biased until a switch 346, activated by a power-up circuit 348, allows the +5 V signal to provide power at Vcc. The power-up circuit 348 activates the electronic switch 346 only after resetting the display processor 316. The power-up circuit 348, for example, is part No. ICL7665 working in connection with resistors 349, 351, and 353 having values of 620K ohms, 300K ohms and 10 megohms, respectively.

Power is provided from Vcc only to the latch 320, the LCD driver 326, the LCD driver 330, and the oscillator circuit 328. The LCD driver 330 and the oscillator circuit 328 receive power from either the battery 338 or the +5 V power supply output via diodes 350 and 352. This arrangement minimizes current drain from the battery 338 while allowing the user to view the status of the tripping system 100 during any power fault situation.

Power cannot be drawn from the battery 338 unless the battery 338 is interconnected with the remaining portion of the tripping system via connector 310, because the connector 310 provides the ground connection for the negative terminal of the battery 338. This aspect of the local display 150 further prolongs battery life and therefore minimizes system maintenance.

Figure 3B:
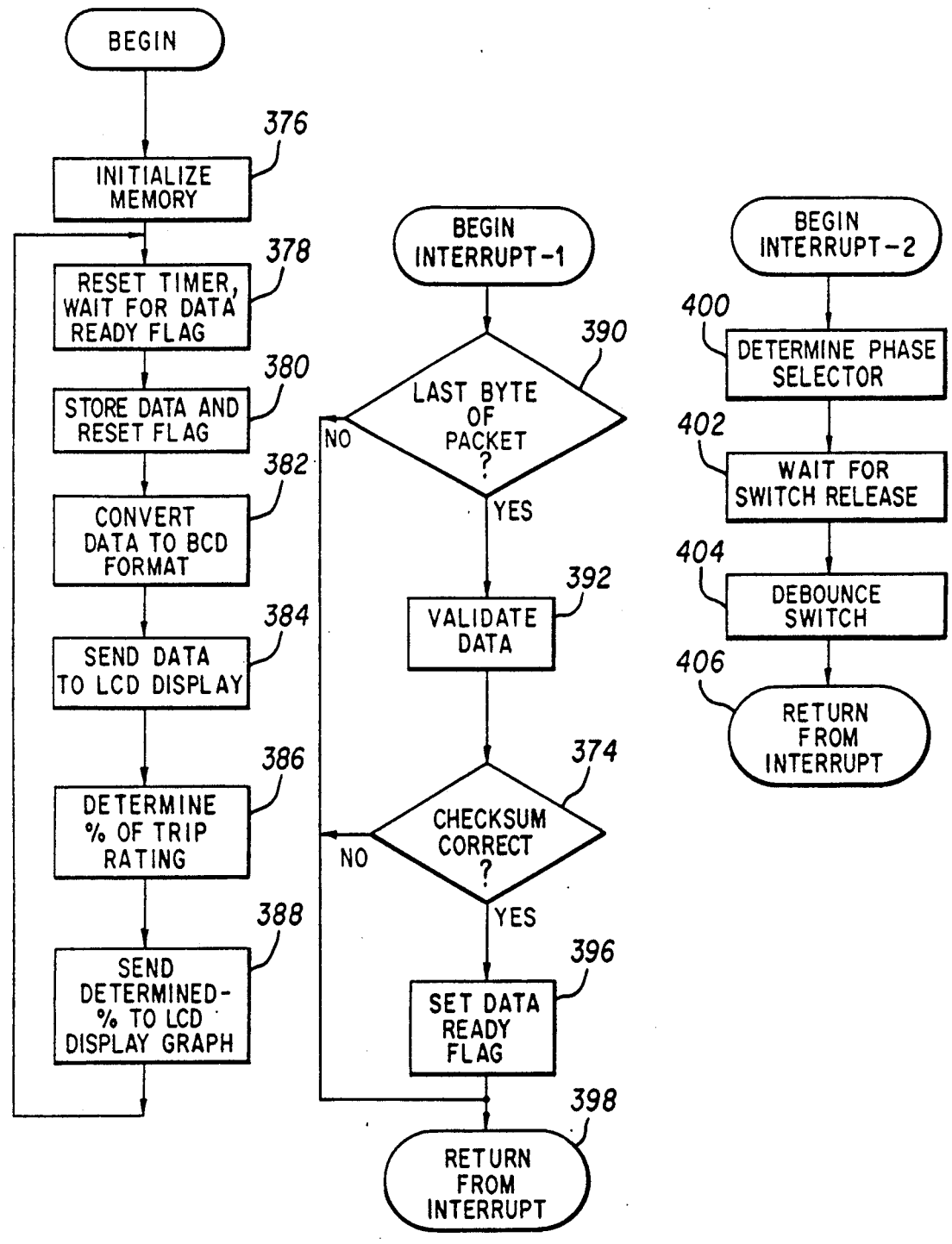

In FIG. 3b, a flow chart illustrates the preferred programming of the display processor 316. The flow chart begins at block 376 where the memory internal to the display processor is initialized. The memory initialization includes clearing internal RAM, input output ports and interrupt and stack registers.

At block 378, a software timer is reset and the display processor waits for a data ready flag which indicates that data has been received from the microcomputer 120 of FIG. 1. The software timer provides a conventional software watchdog function to maintain the sanity of the display processor. If the software timer is not reset periodically (within a certain time interval), the display processor resets itself.

The data ready flag is set in an interrupt routine, illustrated by blocks 390 through 398 of FIG. 3b. The display processor is programmed to execute the interrupt routine when it receives data from the microcomputer 120 of FIG. 1. At block 390 of the interrupt routine, a test is performed to determine if the data byte just received is the last data byte of the packet sent from the microcomputer. If the data byte just received is not the last data byte, flow proceeds to block 398 where a return-from-interrupt instruction is executed. If the data byte just received is the last data byte, flow proceeds to block 392.

At block 392, a test is performed to determine the integrity of the received data packet. This is accomplished by comparing the 8-bit sum of the previously received 7 bytes with the most recently received byte (last byte). If the 8-bit sum and the last byte are different, flow proceeds to block 398. If the 8-bit sum and the last byte are the same, the display processor sets the previously referred to data ready flag, depicted at block 396, and returns from the interrupt, via block 398, to block 380.

At block 380, the received data is stored in memory and the data ready flag is reset.

At blocks 382 and 384, the display processor utilizes a conventional conversion technique to convert the stored data to BCD format for display at the LCD display 322 of FIG. 3a. The data that is sent and displayed at the LCD display 322 is chosen by the operator using the switch 311 to sequence through each of the three phase currents and the ground fault current, as indicated in the data that is received from the microcomputer 120 of FIG. 1.

At block 386, the display processor utilizes received data, including the sensor identification, the rating plug type and the long-time pickup level, to determine the percentage of rated trip current being carried on lines 106 of FIG. 1. At block 388, the bar segments (324 and 332-335 of FIG. 3a) are driven by the display processor in response to this determination. From block 388, flow returns to block 378.

Blocks 400-406 of FIG. 3b represent a second interrupt routine which the display processor may be programmed to execute in response to the depression of the switch 311. At block 400 of this second interrupt routine, the display processor determines which phase (or ground fault) current the operator has selected by depressing the switch 311. At blocks 402 and 404, the display processor monitors its I/0 port to determine when the switch 311 is released and to debounce the signal received from the switch 311. At block 406, the display processor executes a return from interrupt command.

It should be noted that the display processor 316 is optional for the local display 150 and therefore not required for its operation. Further, the local display 150 is itself an option to the tripping system and is not required for operating the tripping system.

B. Current and Ground Fault Detection

Figure 4:
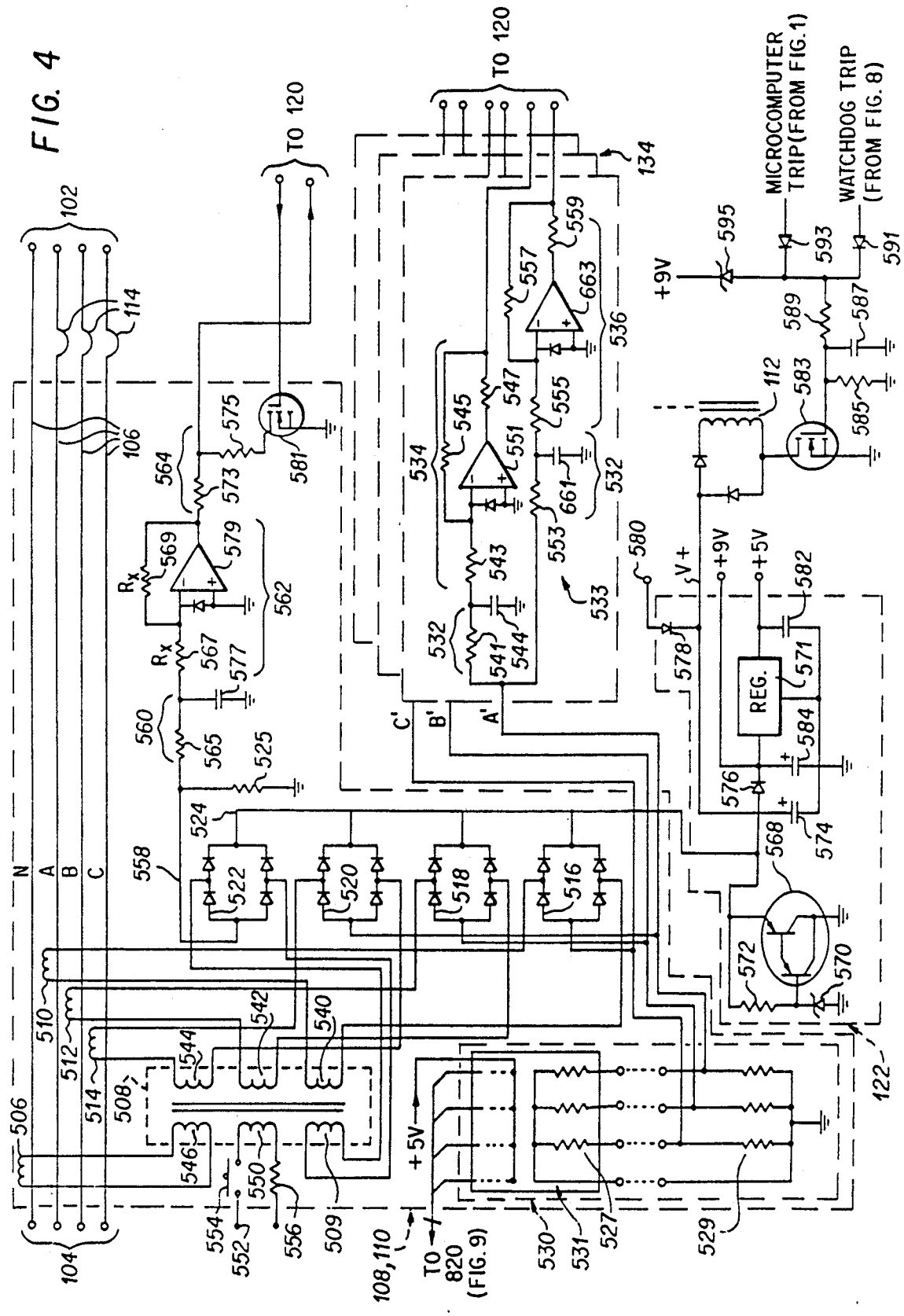
FIG. 4 is a schematic diagram illustrating an analog input circuit 108, a ground fault sensor circuit 110, a gain circuit 134 and a power supply 122 of FIG. 1.

FIG. 4 illustrates an expanded view of the analog input circuit 108, the ground fault sensor 110, the power supply 122 and the gain circuit 134 of FIG. 1. Each of these circuits receives power from the three-phase current lines 106. Using this power, these circuits provide signals from which the tripping system 100: (1) determines the phase and current levels on lines 106, (2) detects the presence of any ground fault, (3) provides system power and (4) establishes its current rating.

(1) Determining Phase and Current Levels

In FIG. 4, the analog input and ground fault sensing circuits 108 and 110 include Current transformers 510, 512 and 514 that are suitably located adjacent the lines 106 for receiving energy from each respective phase current path A, B, and C. Each current transformer 510, 512 and 514 is constructed to produce a current output that is proportional to the primary current in a fixed ratio. This ratio is set so that when the primary current is 100% of the rated current transformer size (or sensor size), the current transformer is producing a fixed output current level. For example, for a 200 Amp circuit breaker, each current transformer 510, 512 and 514 will produce the same current output signal when operating at 100% (200 Amps) as a current transformer in a 4000

Amp circuit breaker which it is operating at 100% (4000 Amps). The preferred construction yields a current transformer output current of 282.8 milliamperes (RMS) when the primary current is 100% of the rated current.

The output currents provided by the transformers 510, 512 and 514 are routed through a ground fault sensing toroid 508, full wave rectifier bridges 516, 518 and 520 and the power supply 122 to tripping system ground. The output currents are returned from tripping system ground through a burden resistor arrangement 530. The ground fault sensing toroid 508 sums the output currents from the transformers 510, 512 and 514. In a system utilizing a neutral (N) line 106, the ground fault sensing toroid also sums the output current from a transformer 506, which is coupled to the neutral line (N) to sense any return current. A signal representing this current summation is produced at an output winding 509 and is carried to a fourth rectifier bridge 522. The rectifier bridge 522 is used to detect ground fault conditions and is discussed in the second part of this section.

On the right (positive) side of the rectifier bridges 516–522, positive phase current signals are produced and added together at lead 524. The current at lead 524 is used for the power supply 122 which is discussed in the third part of this section.

On the left (negative) side of the rectifier bridges 516–520, negative phase current signals are carried through the burden resistor arrangement 530 and tripping system ground, and are returned to the rectifier bridges 516–520 through the power supply 122. This current path establishes voltage signals A', B' and C', each referred to as a burden voltage, for measurement by the microcomputer 120 via the gain circuit 134.

In FIG. 4, the signals A', B' and C' are presented to the respective dual gain sections for inversion and amplification. The gain circuit 134 of FIG. 4 is shown with one of its three identical dual gain sections, generally designated as 533, in expanded form. The dual gain section 533 receives phase signal A'. Each dual gain section includes a pair of low pass filters 532 and a pair of amplifiers 534 and 536. The low pass filters 532 provide noise suppression, and the amplifiers 534 and 536 reduce the signal magnitude by 0.5 and increase the signal magnitude by a factor of 3, respectively, for the desired resolution. This arrangement allows the microcomputer 120 to instantaneously measure these current levels without wasting time changing any gain circuitry. Preferred component values are, for example, 10K ohms for resistors 541, 543, 545, 553 and 555; 4.75K ohms for resistors 547 and 559; 60K ohms for resistor 557; and 0.03 microfarads for capacitors 549 and 561. The amplifiers 551 and 663 are, for example, part No. LM124.

Using the gain circuit 134, the microcomputer 120 measures the true RMS current levels on lines 106 by sampling the burden voltages developed at signals A', B' and C'. The RMS calculations are based on the formula:

$$I_{RMS}^2 = \frac{\sum_{t=0}^{N} I(t)^2}{N}$$

where:
N = the number of samples;
t = time at discrete intervals (determined by sample rate); and
I(t) = the instantaneous value of the current flowing through the breaker.

The current flowing through the circuit breaker is sampled at fixed time intervals, thereby developing I(t). The value of this instantaneous current sample is squared and summed with other squared samples for a fixed number of samples N. The mean of this summation is found by dividing it by N. The final RMS current value is then found by taking the square root of the mean.

Figure 5:
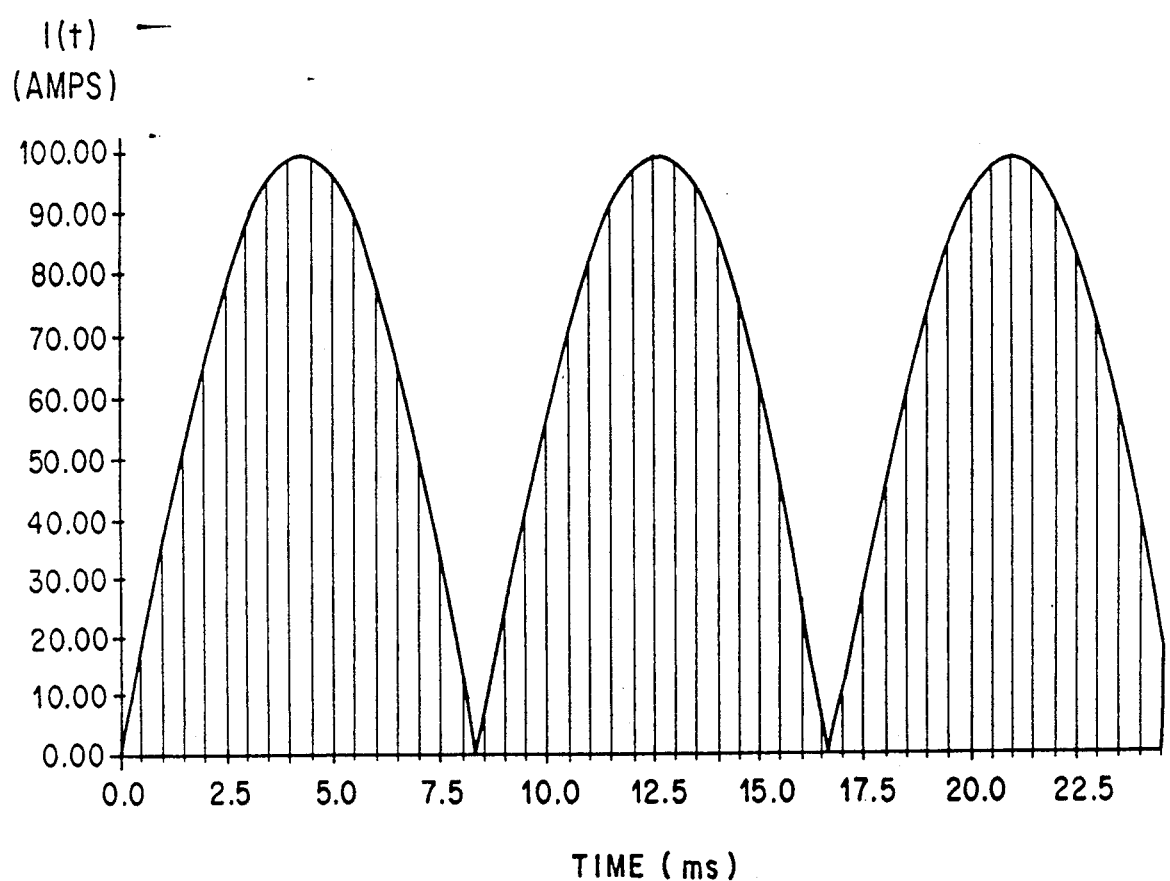
FIG. 5 is a timing diagram illustrating the preferred manner in which signals received from the gain circuit 134 are sampled by the microcomputer 120 of FIG. 1.

In FIG. 5, an example of a rectified sinusoidal current waveform is illustrated for 1.5 cycles of a 60 hertz signal with a peak amplitude of 100 amps. The sampled current is full wave rectified. The vertical lines represent the discrete points in time that a value of current is sampled. With a sample rate of 0.5 milliseconds, over 25 milliseconds of time, 50 samples will be taken.

In TABLE 1, the data for the samples from FIG. 4 are illustrated in the column labeled I(t) (Amps). The column labeled I(t) SQUARED (Amps) gives the squared values, and the column labeled SUMMATION (Amps) shows the accumulation of the squared current values over time. The mean of the summation, depicted at the bottom of TABLE 1, is equal to the final accumulation divided by the number of samples, or 50. The square root of this value yields 70.7106854, which is less than 0.00001% in error.

The other columns in TABLE 1 detail the binary equivalent data that the microcomputer would process using the ratio that 100 amps equals 255 binary.

The value $I_{RMS}$ will accurately reflect the heating effect of the current waveform that existed from t=0 to t=N. This current waveform is typically an A.C. waveform with a fundamental frequency of 50 to 60 Hertz, but may contain many upper harmonics (i.e., multiples of the fundamental frequency).

In practical implementations, several factors affect the accuracy of the $I_{RMS}$ calculation, including the sample rate and the number of samples. In the preferred embodiment, the sample rate is 2,000 Hertz and at least 128 samples are taken before the current magnitude is estimated.

(2) Detecting The Presence Of A Ground Fault

The ground fault sensing toroid 508 magnetically adds the current signals from the input windings 540, 542, 544 and 546 to indicate whether or not a ground fault is present on lines 106. The toroid 508 is constructed with four identical input windings 540, 542, 544 and 546; one for each of the current transformers 510, 512 and 514 and one for the neutral current path transformer 506, which is optional. The toroid 508 has a single output winding 509 which provides a summed current signal.

The ground fault sensing toroid 508 includes another winding 550 to allow a test signal to be applied at terminals 552. Using momentary switch 554, the test signal creates a pseudo ground fault for the tripping system. The tripping system reacts to this pseudo ground fault in the same manner as a true ground fault. The test winding 550 is protected by a positive coefficient resistor 556 that increases its resistance as it heats, thereby limiting the current through it and the winding 550. The positive coefficient resistor is, for example, a Keystone PTC Resettable Fuse, part No. RL3510-110-120-PTF. The test winding 550 eliminates the need for a separate test transformer which has been utilized by systems in the prior art.

The operation of the ground fault sensing toroid 508 is best understood by considering the operation of the tripping system with a ground fault and without a ground fault. In a balanced three phase system without a ground fault, the current magnitude in each phase is equal but 120 degrees out of phase with the other phases, and no neutral current exists; thus, the output winding 509 produces no current. As the current through any phase (A, B or C) increases, the current in the neutral path is vectorially equal in magnitude but opposite in direction to the increase in phase current, and the magnetic summation is still zero. When a ground fault is present, current flows through an inadvertent path to an earth grounded object, by-passing the neutral transformer 506 and creating a current signal in the transformer 509. Thus, the transformer 509 produces a current signal only when a ground fault is present.

The current signal from the output transformer 509 of the ground fault sensing toroid 508 is routed through the rectifier bridge 522, the power supply 122 and returned through the burden resistor arrangement 530. The burden resistor arrangement 530 and the rectifier bridge 522 convert that current signal into an A.C. rectified signal 558 that is inverted with respect to tripping system ground, and that has a voltage that is proportional to the current in the transformer 509.

The A.C. rectified signal 558 is filtered by filter 560 for noise suppression and then inverted using analog invertor 562. From the analog invertor 562, a positive going signal is carried to an A/D input at the microcomputer 120. The microcomputer 120 measures the peak levels at the output of the analog invertor 562 to detect the presence of a ground fault. A conventional voltage divider switch 564 is controlled by the microcomputer 120 to selectively reduce that signal by two thirds, as may be required under severe ground fault conditions. Preferred component values are, for example, 10K ohms for resistors 565 and 567; 20K ohms for resistor 569; 19.6K ohms for resistor 573; 10K ohms for resistor 575; 0.033 microfarads for capacitor 577; part No. LM124 for amplifier 579; and part No. BS170 for IGFET 581.

(3) Providing system Power

Power for the tripping system is provided directly from the current on lines 106, and current on any one of the lines 106 can be used. This feature allows the tripping system to power-up on any one of the three phases and to be powered when a ground fault on one or more of the phase lines 106 is present.

The output currents which are induced by the transformers 510, 512 and 514 are routed through the rectifier bridges 516, 518, 520 and 522 to provide the current for the power supply 122. On the right side of the rectifier bridges 516–522, at lead 524, the output currents are summed and fed directly to a Darlington transistor 568, a 9.1 volts zener diode 570 and a bias resistor 572. Most of this current flows directly through the transistor 568 to ground, to create a constant 9.1 volt level at the base of the transistor 568. Because it has a nominal emitter to base voltage (Veb) of about 1.0 volts, the emitter of the transistor 568 is at approximately 10 volts. The transistor 568 will strive to maintain 10 volts across it from emitter to collector, regardless of the current through it. Preferred component values are, for example, part No. 2N6285 for Darlington transistor 568; 1N4739 for zener diode 570; and 220 ohms for resistor 572.

At the emitter of the transistor 568, the power signal VT ("trip voltage") is provided.

The +5 v signal is a regulated +5 v power supply output signal that is provided using a voltage regulator 571 (part No. LP2950ACZ-5.0) and a capacitor 582 which prevents the output of the regulator 571 from oscillating. The voltage regulator takes its input from VT via a diode 576. The diode 576 charges capacitor 584 to within one diode drop (0.6 v) of VT and creates a second supply source of approximately +9 v, which is referred to as the +9 V power supply. The energy stored in the capacitor 584 enables the electronic circuitry being powered by the +9 V power supply to remain powered for some time after a trip occurs. A capacitor 574, connected at the emitter of the transistor 568, aids in filtering voltage ripple. The capacitor 574 is also utilized as the energy storage element for the solenoid 112 which is activated when a power IGFET 583 is turned on by "trip" signals from the microcomputer (120 in FIG. 1) or from a watchdog circuit (712 in FIG. 8). The trip signals are combined by respective diodes 591, 593. The solenoid 112 is also activated by an overvoltage condition sensed by a 16-volt zener diode 595, such as part No. IN5246. Preferred component values are, for example, 220 microfarads for capacitor 574, 100 microfarads for capacitor 584, 10 microfarads for capacitor 582, 100K ohms for resistor 585, 10K ohms for resistor 589, 0.1 microfarads for capacitor 587, and part No. 6660 for IGFET 583.

Diodes 576 and 578 are used to receive current from an optional external power supply (not shown).

(4) Establishing The Current Rating

On the left side of the rectifier bridges, negative phase signals (A', B' and C') from the bridges are provided to the burden resistor arrangement 530, including a rating plug 531, to set the current rating for the tripping system. As previously discussed, when the primary current is 100% of the rated current or "sensor size", which is designated using the user select circuit 132, the current transformer output current will be 282.8 milliamperes (RMS). Thus, when the microcomputer 120 reads the burden voltages using the gain circuit 134 (FIG. 1), the microcomputer 120 can calculate the actual current in the lines 106.

FIG. 4 illustrates parallel connections between respective resistors 527 and 529 which are used to establish the maximum allowable continuous current passing through the lines 106. The resistors 527 are part of the rating plug 531, and the resistors 529 are separate from the rating plug 531. The resistors 529, for example, are each 4.99 ohm, 1%, 5 watt resistors. This value should be compared to a corresponding value of 12.4 ohms for the burden resistor 525 for the ground fault signal. The resistors 527 of the rating plug are connected in parallel with the resistors 529 and hence cause a decrease in the combined resistance. Therefore, the resistors 529 set the minimum current rating for the tripping system. In a preferred arrangement, for example, the minimum current rating corresponds to 40% of the maximum current rating. The resistors 527 in the rating plug scale the voltages (A', B', C') read by the microcomputer. This enables the resolution of the A/D converter in the microcomputer to be the same in terms of a fraction of the rated current for both the minimum and maximum current rating. Consequently, there is not any sacrifice in converter resolution for the minimum current rating.

Figure 6A:
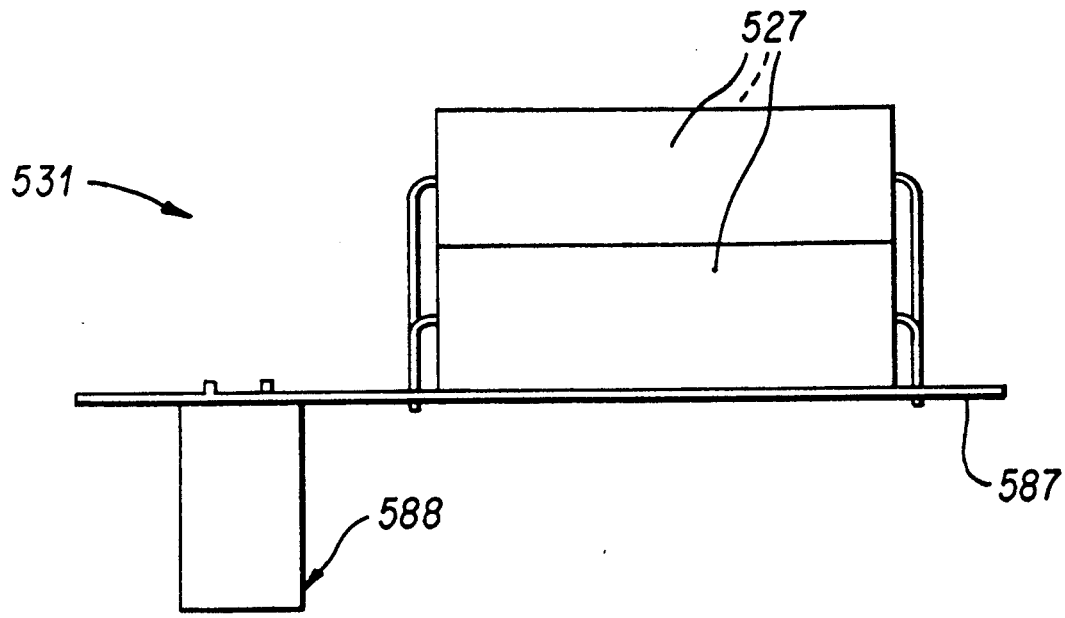
FIG. 6a is a side view of a rating plug 531 of FIG. 4.
Figure 6B:
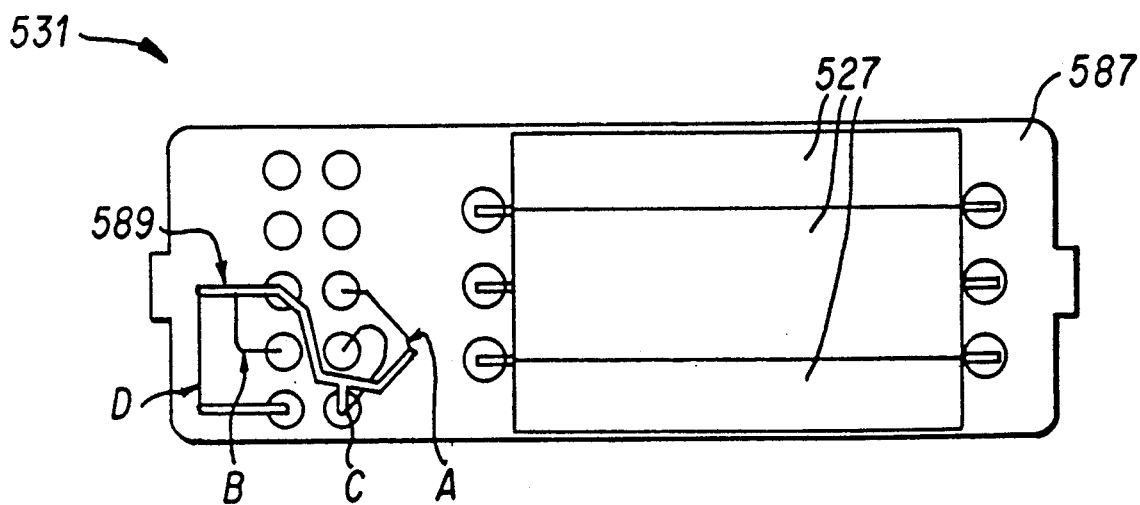
FIG. 6b is a top view of the rating plug 531 of FIG. 4.

In FIGS. 6a and 6b, the rating plug 531 is shown to include the resistors 527 mounted on a printed circuit board 587. A connector 588 is used to interconnect the rating plug with the remaining portion of the tripping system 100. When the rating plug is absent from the tripping system, the system reverts to its minimum rating.

The rating plug 531 further includes copper fusible printed circuit links A, B, C and D which are selectively disconnected (opened) from a printed circuit connection 589 to inform the microcomputer 120 of the resistor values, or the burden voltage/current ratio, in the burden resistor arrangement 530. The printed circuit connection 589 is connected to the +5 V signal via one of the contact points on the connector 588. This connection 589 allows the tripping system to encode the printed circuit links A, B, C and D in binary logic such that one of 16 values of each parallel resistor arrangement is defined therefrom. In a preferred arrangement, the binary codes "1111" and "1110" are reserved for testing purposes, and the fourteen codes "0000" to "1101" correspond to current rating multipliers of 0.400 to 1.000 as follows:

| Code | Current Rating Multiplier |
|------|---------------------------|
| 0000 | 0.400 |
| 0001 | 0.500 |
| 0010 | 0.536 |
| 0011 | 0.583 |
| 0100 | 0.600 |
| 0101 | 0.625 |
| 0110 | 0.667 |
| 0111 | 0.700 |
| 1000 | 0.750 |
| 1001 | 0.800 |
| 1010 | 0.833 |
| 1011 | 0.875 |
| 1100 | 0.900 |
| 1101 | 1.000 |

Figure 9:
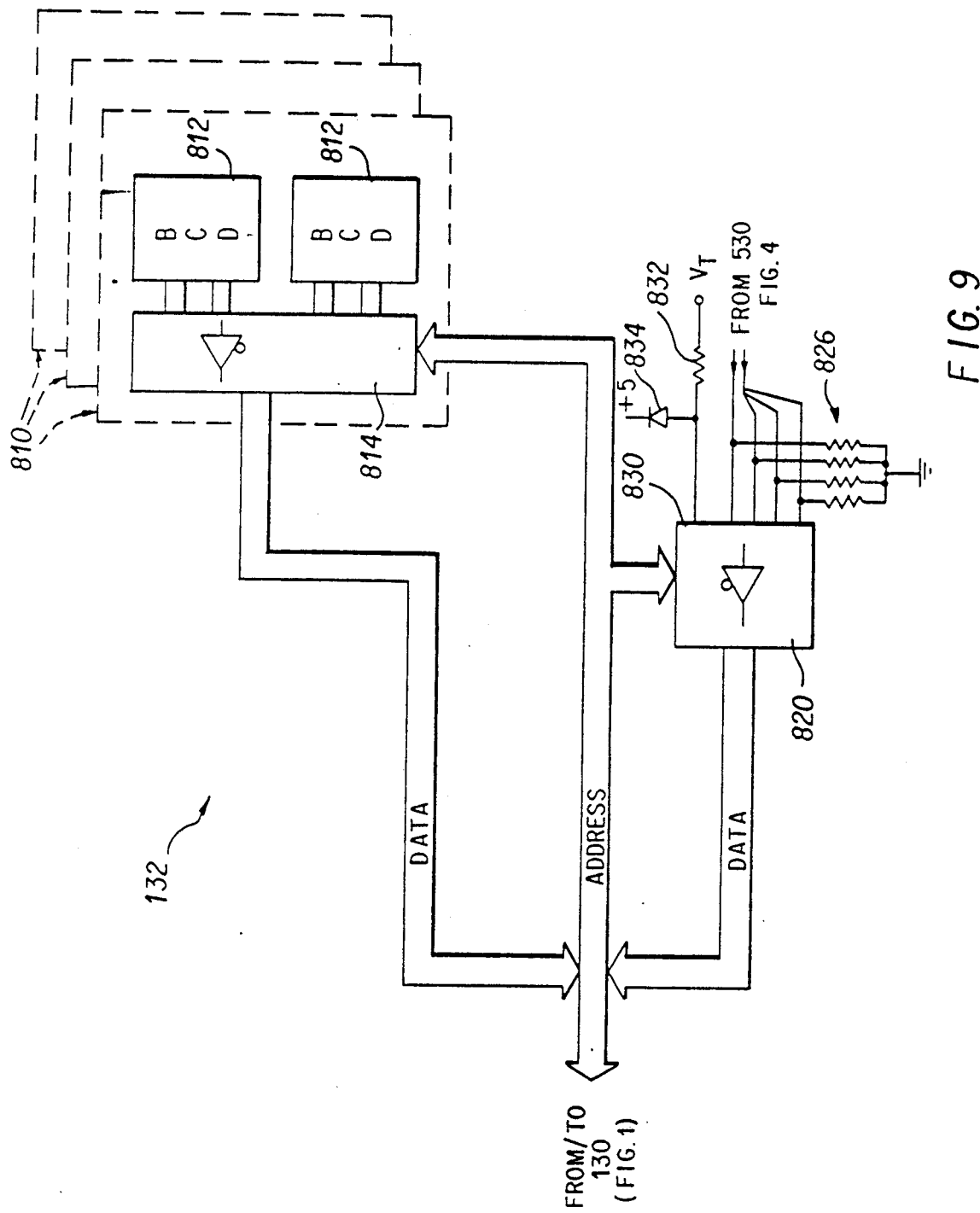
FIG. 9 is an illustration of a user select circuit 132 of FIG. 1.

The user select circuit 132 of FIG. 9 includes the interface circuit used by the microcomputer 120 to read the binary coded resistor value from the rating plug 531. A tristate buffer 820 allows the microcomputer 120 to selectively read the logic level of each of the four leads representing the status of the four fusible printed circuit links on the rating plug 531. A logic high at the input of the buffer 820, provided by the connection between the fusible printed circuit link and +5 V signal, indicates that the corresponding link is closed. A logic low at the input of the buffer 820, provided by pull-down resistors 826 at the input of the buffer 820, indicates that the corresponding link is open. The fusible printed circuit links A, B, C and D may be opened using a current generator to send an excessive amount of current through the links, thereby causing the copper links to burn. This is preferably performed before the rating plug 531 is installed in the tripping system. Thus, once installed, the rating plug 531 automatically informs the microcomputer 120 of its resistor values, and there is no need to adjust any settings or otherwise inform the microcomputer of the type of rating plug being used. The microcomputer may adjust the values read from its A/D converter by a predetermined scale factor corresponding to the binary coded resistor value to compute actual current values which are independent of the resistor values in the rating plug 531.

C. Bi-metal Deflection Simulation

The microcomputer 120 is programmed to simulate accurately the bi-metal deflection mechanism that is commonly used in processor-less tripping systems. This is accomplished by accumulating the squared values of the measured current samples that are sensed by the analog input circuit 108. The sum of the squared values of that current is proportional to the accumulated heat in the tripping system 100.

To simulate the bi-metal deflection during cooling, the microcomputer 120 is programmed to decrement logarithmically the accumulated square of the current. In other words, during a sampling interval, the accumulated value A of $I(t)^2$ is decremented by an amount proportional to A to account for the fact that the rate of heat loss is proportional to the temperature of the power system conductors above ambient temperature. In particular, the temperature in the tripping system 100 decreases in response to the current path in lines 106 being broken or intermittent. When this occurs, however, the microcomputer 120 loses operating power and therefore can no longer maintain this numerical simulation.

Figure 7:
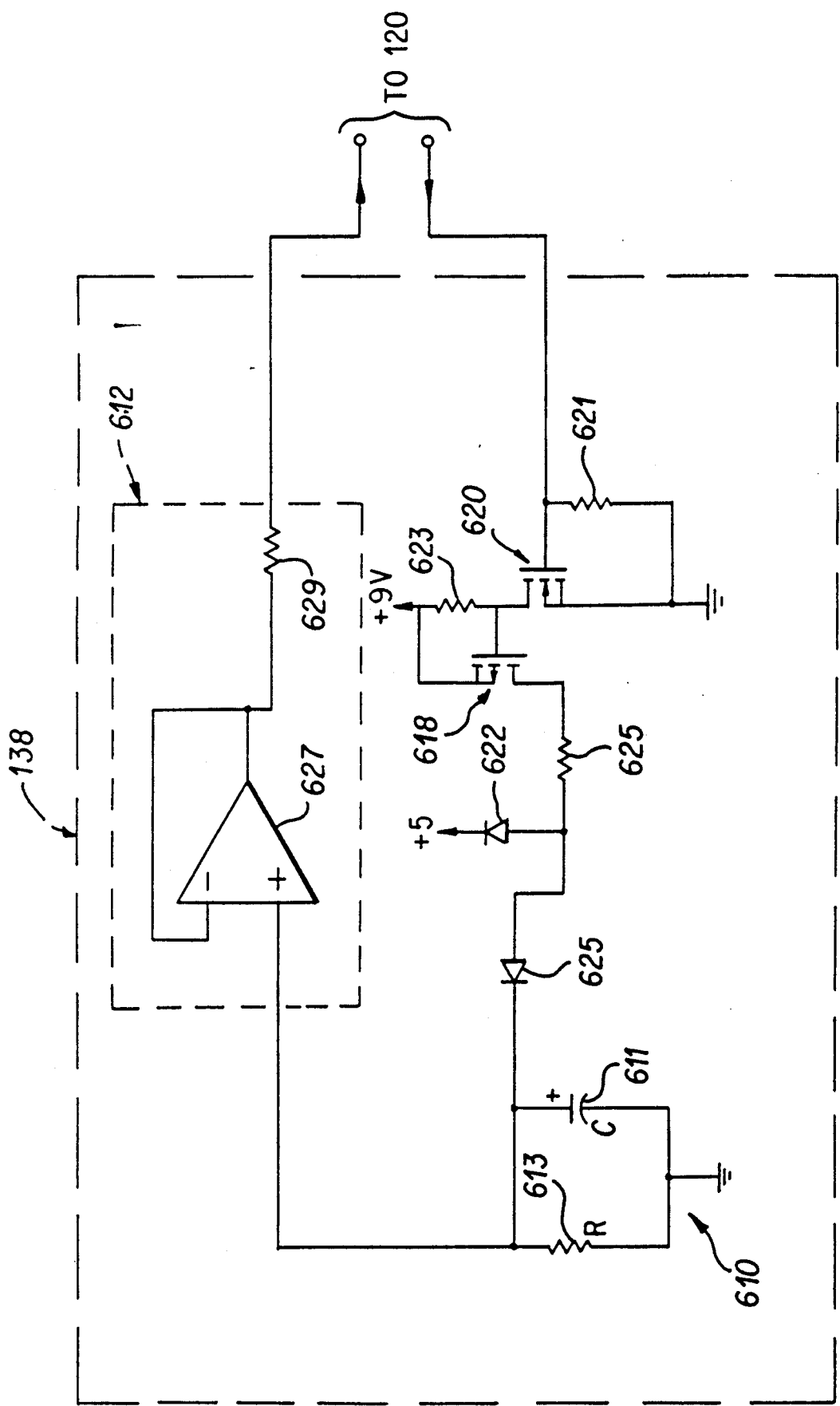
FIG. 7 is a schematic diagram illustrating a thermal memory 138 of FIG. 1.

This problem is overcome by utilizing the thermal memory 138 of FIG. 1 to maintain a history of the accumulated current for a predetermined period of time during which the operating power to the microcomputer 120 is lost. As illustrated in FIG. 7, this is accomplished using an RC circuit 610 that is monitored and controlled by the microcomputer 120 to maintain a voltage on the capacitor 611 that is proportional to the accumulated square of the current. When the microcomputer loses power, the voltage across the RC circuit 610 logarithmically decays. (The decay is governed by the equation $V = V_0 \exp(-t/RC)$.) Should the microcomputer power-up again before the voltage reaches zero, the microcomputer 120 reads the voltage across the RC circuit 610 using a conventional analog buffer 612 and initializes its delay accumulator to the correct value. The analog buffer 612, for example, includes an amplifier 627 such as part No. LM714 and a 4.7K ohm resistor 629.

The preferred RC circuit 610, including a 100 microfarad capacitor 611 and a 3.24 megohm resistor 613, provides a fixed time constant of 324 seconds, or approximately 5.4 minutes.

Control over the voltage on the RC circuit 610 is provided using IGFET transistors 618 and 620, such as part Nos. VP0808 and BS170, respectively. During normal, quiescent conditions, the microcomputer 120 will not be in an overload condition and will drive a logic low at the gate of the transistor 620, thereby disabling transistors 620 and 622 and allowing the capacitor 611 to discharge to tripping system ground. Transistors 618 and 620 work in connection with resistors 621, 623 and 625, which have values, for example, of 100K ohms, 47K ohms, and 5.1K ohms, respectively.

During overload conditions, the microcomputer 120 accumulates current information in its internal RAM to simulate the heat level, and drives a logic high at the gate of the transistor 620 to allow the capacitor 611 to charge to a selected corresponding level. While the capacitor 611 is charging, the microcomputer 120 monitors the voltage level using the analog buffer 612. When the selected level is reached, the microcomputer drives a logic low at the gate of the transistor 620 to prevent further charging. The voltage on the capacitor 611 is limited to five volts using a clamping diode 622. The forward voltage drop across the clamping diode 622 is balanced by the voltage drop through a series diode 625.

For example, assume that an overload condition suddenly occurs and the microcomputer 120 has been programmed to allow for a two minute delay before generating a trip signal at this overload fault level. After one minute in this overload condition, the microcomputer 120 will have accumulated current information which indicates that it is 50% of the way to tripping. The microcomputer will also have enabled the RC circuit 610 to charge to 2.5 v; that is, 50% of the maximum 5 v. Assuming, for the purpose of this example, that the overload fault condition is removed at this point and the electronic trip system loses operating power, when the power to the microcomputer 120 drops to 0 v, the internally stored current accumulation is lost. However, the voltage across the RC circuit 610 is still present and will start to decay by approximately 63.2% every 5.4 minutes (the time constant for the RC circuit 610). Therefore, after 5.4 minutes without current, the voltage across the RC circuit 610 will be 36.8% of 2.5 v, or 0.92 v.

If the overload condition would occur again at this point, the microcomputer 120 would power up and measure 0.92 v across the RC circuit 610. The microcomputer 120 would then initialize its internal current accumulation to approximately 18% (0.92 v divided by the maximum of 5.0 v) of the preprogrammed full trip delay time.

The accumulation calculations performed by the microcomputer are based on the formula:

$$A = \sum_{t=0}^{N} I(t)^2$$

where:

N = then umber of samples;

t = time at discrete intervals (determined by the accumulation rate); and

I(t) = the true RMS value of current through the breaker.

During a fault, the trip unit will begin to sum the current squared value as soon as the current exceeds a predetermined level for a predetermined period of time, or the selected overload condition. The electronic trip system will maintain an internal accumulation register to store a value that is proportional to the square of the current and that is incremented periodically based on the accumulation rate. Assuming a constant fault level of current, a fixed accumulation rate, and a known condition of the accumulation register at t=0, the value in the accumulation register will increase at a determinate rate and will contain a known value at any given time t.

For example, assume that a continuous fault is measured at 70.71 amperes (RMS) with an accumulation period of 64 milliseconds. Further assume that the accumulation register is at zero prior to the fault. The microcomputer 120 will accumulate the squared value of the current every 64 milliseconds into the register, causing it to increase at a constant rate.

With a continuous, fixed level fault, as time increases, the internal accumulation register increases proportionally. In order to protect the system from this fault, this increasing accumulated value is compared periodically against a predetermined threshold value that has been chosen to represent the maximum allowed heat content of the system. When the accumulated value equals or exceeds this predetermined threshold value, the tripping system will trip the breaker.

A valuable aspect of accumulating the current squared value is that as the current doubles, the current squared value quadruples and the internal accumulation register increases at a more rapid rate, resulting in a more rapid trip. Thus, if the delay time (the period before the detected power fault causes a trip) is x seconds at some current level, as the current doubles, the delay time will be x/4 seconds.

The formula for calculating the delay time for any constant current is:

$$T = \frac{A_R \times K}{I^2}$$

where:

$A_R$ = the accumulation rate in seconds;

K = predetermined final accumulation value; and

I = the true RMS value of current flowing through the breaker.

D. Reset Circuitry

Figure 8:
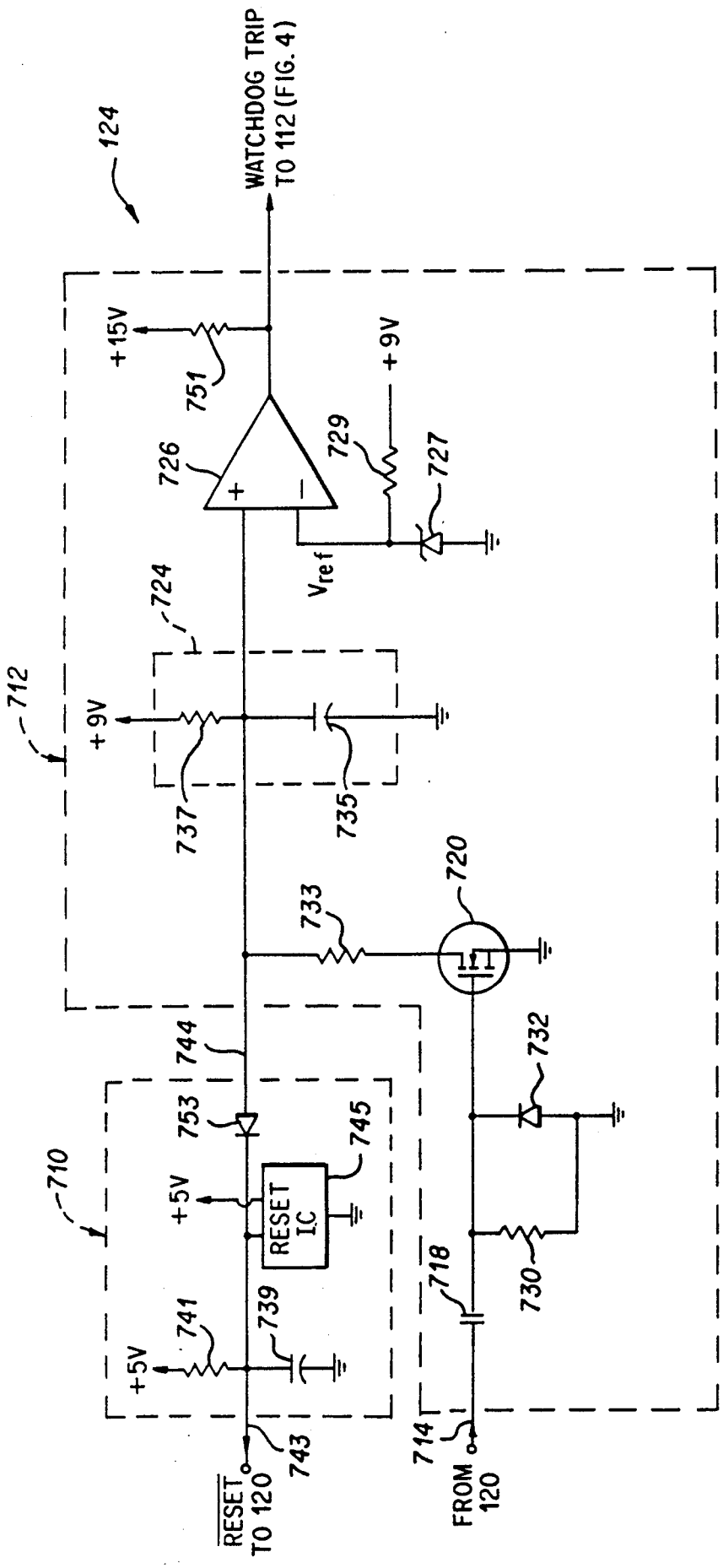
FIG. 8 is a schematic diagram illustrating the reset circuit 124 of FIG. 1.

Referring now to FIG. 8, an expanded view of the reset circuit 124 is shown to include a power-up reset circuit 710 and a watch-dog circuit 712 to maintain the integrity of the tripping system 100. The power-up reset circuit 710 performs two functions, both of which occur during power-up: it provides a reset signal (asserted low) on line 743 to maintain the microcomputer 120 in reset condition until the tripping system 100 develops sufficient operating power from the current lines 106; and it provides a reset signal (asserted low) via lead 744 to the watch-dog circuit 712 to prevent the watch-dog circuit from engaging the solenoid 112 during power-up. This latter function prevents nuisance tripping.

Preferably the power-up reset circuit includes an under-voltage sensing integrated circuit 745 that detects whether or not the output voltage of the +5 volt supply is less than a predetermined reference voltage at which the microcomputer (120 in FIG. 1) may properly function. The integrated circuit 745 is, for example, part No. MC33064P-5, which holds the reset line 743 low until the output voltage of the +5 volt supply rises above 4.6 volts. The microcomputer 120 may operate at 4.5 volts or above. The preferred reset circuit also includes a pull-up resistor 741, a capacitor 739, and a diode 753 connecting the integrated circuit 745 to the watchdog circuit 712 The resistor 741, for example, has a value of 47K ohms and the capacitor 739 has a value of 0.01 microfarads. The diode 753 ensures that the reset circuit 710 affects the watchdog circuit 712 only when the microcomputer 160 is being reset.

The watch-dog circuit 712 protects the tripping system from microcomputer malfunctions. Thus, it is designed to engage the solenoid 112 if the microcomputer 120 fails to reset the watch-dog circuit 712 within a predetermined time period. The microcomputer 120 resets the watch-dog circuit 712 by regularly generating logic high pulses, preferably about every 200 milliseconds, on lead 714. These pulses are passed through a capacitor 718 to activate an IGFET transistor 720, which in turn discharges an RC timing circuit 724 through a circuit limiting resistor 733. A resistor 730 and a clamping diode 732 are used to reference the pulses from the capacitor 718 to ground.

The pulses on lead 714 prevent the RC timing circuit 724 from charging up past a reference voltage, Vref, at the input of a comparator 726. If the RC timing circuit 724 charges up past Vref, the comparator 726 sends a trip signal to the solenoid 112 to interrupt the current path in lines 106. The reference voltage, for example, is provided by a 4.3 volt zener diode 427 supplied with current through a resistor 729. Preferred component values are, for example, 0.001 microfarads for capacitor 718, 27K ohms for resistor 730, part No. IN4148 for diode 732, part No. BS170 for transistor 720, 10 ohms for resistor 733, 820K megohms for resistor 737, 0.22 microfarads for capacitor 735, part No. LM29031 for comparator 726, part No. 1N4687 for diode 727, 100K ohms for resistor 729, and 10K ohms for resistor 751.

User Select Switches

As introduced above, the user select circuit 132 is illustrated in FIG. 9. In addition to the buffer 820 for the rating plug, the user select circuit 132 includes a plurality of user interface circuits 810 each having a pair of BCD dials 812 and a tri-state buffer 814 which is enabled through the address and data decoder 130 of FIG. 1. Each BCD dial 812 allows the user to select one of several tripping system characteristics. For example, a pair of BCD switches may be used to designate the longtime pickup and the longtime delay (overload tripping characteristics) and another pair of BCD switches may be used to designate the short time pickup and the short time delay (short circuit tripping characteristics). Other BCD switches may be used to designate sensor and breaker sizes, an instantaneous pickup, ground fault tripping characteristics, and phase unbalance thresholds.

F. Energy Validation For Solenoid Activation

The user select circuit 132 of FIG. 1 and 9 also determines if there is sufficient energy to activate the solenoid 112. Using the address and data decoding circuit 130, the buffer 820 is selected to read one of its input lines 830. The VT signal from the power supply 122 of FIG. 1 feeds the input line 830, with the buffer 820 being protected from excessive voltage by a resistor 832 and a clamping diode 834. The resistor 832, for example, has a value of 620K ohms.

Before the microcomputer 120 engages the solenoid 112, the input line 830 is accessed to determine if VT is read as a logic high or a logic low. The buffer 820 provides a logic high at its output whenever the input is greater than 2.5 v to 3 v. If VT is read as a logic high, the microcomputer 120 determines that there is sufficient power to activate the solenoid 112 and attempts to do so. If VT is read as a logic low, the microcomputer 120 determines that there is insufficient power to activate the solenoid 112 and waits, while repeatedly checking VT, in anticipation that an intermittent power fault caused VT to fall. Once VT rises beyond the 2.5–3.0 volt level, the microcomputer 120 attempts to activate the solenoid once again.

G. Communication For Information Display

The microcomputer 120 sends identical tripping system status information to the local display 150 and the display terminal 162. The information is sent synchronously on a serial peripheral interface 191 to the local display 150 and asynchronously on a serial communication interface 151 to the display terminal 162. The interfaces 151 and 191 may be implemented using the SCI and SPI ports internal to the MC68HC11. The history of the tripping system status information is stored in the nonvolatile trip memory 144. That history includes the specific cause and current level of the last trip and a running accumulation of the different trip causes.

The trip memory 144 is preferably an electrically erasable programmable ROM (EEPROM), for example, a X24CO4I, available from Xicor, Inc. of Milpitas, Calif. In this case, the serial peripheral interface 191 is used for bidirectional data transfer between the microcomputer 120 and the EEPROM 144. This data transfer is implemented using one line of the serial peripheral interface 191 to transfer the data and the other line to transmit a clock signal between the microcomputer 120 and the EEPROM 114 for synchronization. During power up of the tripping system 100, the microcomputer 120 transmits to the trip memory 144 a unique bit pattern which is interpreted as a data request code. The microcomputer 120 then sets the bidirectional data line as an input and clocks the requested data in from the trip memory 144.

The microcomputer 120 maintains a copy of the history data in its internal RAM and in the event of a trip, updates it and transmits it back into trip memory 144 via the interface 191, again utilizing the unique bit pattern to set the trip memory 144 to a receive mode. Upon receipt of the data, trip memory 144 will reprogram its contents, overwriting the old history information with the newly received data.

During normal operation (i.e., after power up and without a trip), the microcomputer 120 transmits operational information over the serial peripheral interface 191. Because this information does not contain the unique bit patterns required to activate the trip memory 144, the trip memory 144 ignores the normal transmissions. However, other devices which may be connected to the serial peripheral interface 191 can receive and interpret the information correctly.

The microcomputer 120, for example, is programmed to execute a communication procedure that permits the tripping system 100 to communicate with a relatively low power processor in the display processor 316. The procedure utilizes a software interrupt mechanism to track the frequency with which information is sent on the interfaces 151 and 191. During normal operation, one 8-bit byte of information is sent every seven milliseconds. During tripping conditions, information is sent continuously as fast as the microcomputer 120 can transmit. This procedure allows the display terminal 162 and the display processor 316 to display continuously status messages from the tripping system 100 without dedicating their processors exclusively to this reception function. Equally important, this procedure permits the microcomputer 120 to perform a variety of tasks, including continuous analysis of the current on lines 106.

Status messages are preferably transmitted using an 8-byte per packet, multi-packet transmission technique. The type of information included in each packet may be categorized into eight different groups, or eight different packets, packet 0 through packet 7. The first byte of each packet is used to identify the byte and packet numbers and the trip status of the tripping system 100. For example, the first byte may contain one bit to identify the byte type, four bits to identify the packet number and three bits to identify the trip status: no trip condition, current overload trip, short circuit trip, instantaneous trip, ground fault trip and phase unbalance trip. Bytes two through six of each packet vary depending on the packet number. Byte 7 is used to identify the tripping system sending the information (for a multiple system configuration), and byte 8 is used as a checksum to verify the integrity of the data.

The microcomputer alternates the type of information included in each packet, depending upon the priority type of the information. During normal (non-tripping) conditions, the trip unit will transmit Packet Number 0, followed by Packet Number 1, followed by one of the remaining defined Packet Numbers, 2 through 7. The sequence is graphically shown as:

| | | |
|---|---|---|
| 1) | Packet 0 - Packet 1 - Packet 2 | |
| 2) | Packet 0 - Packet 1 - Packet 3 | |
| 3) | Packet 0 - Packet 1 - Packet 4 | Repeat until Trip |
| 4) | Packet 0 - Packet 1 - Packet 5 | Occurs |
| 5) | Packet 0 - Packet 1 - Packet 6 | |
| 6) | Packet 0 - Packet 1 - Packet 7 | |

During a trip condition, the normal operation packet transmission sequence is interrupted and Packet number 2 is transmitted continuously until power is lost. The transmission rate will be increased to the fastest rate possible.

The five bytes of each packet that vary according to packet number are configured for a total of eight different packets, 0–7. The information in these bytes is implemented for each packet number as follows:

Packet 0 - (0 0 0 0)
Data Byte 1 - Phase A Current - High Byte
Data Byte 2 - Phase A Current - Low Byte
Data Byte 3 - Phase B Current - High Byte
Data Byte 4 - Phase B Current - Low Byte
Data Byte 5 - Overload Pickups and Short Circuit Restraint In Packet 1 (0 0 0 1)
Data Byte 1 - Phase C Current - High Byte
Data Byte 2 - Phase C Current - Low Byte
Data Byte 3 - Ground Fault Current - High Byte
Data Byte 4 - Ground Fault Current - Low Byte,
Data Byte 5 - Short Circuit, Phase Unbalance and Ground Fault Pickups Packet 2 - (0 0 1 0)
Data Byte 1 - Maximum Phase Current - High Byte
Data Byte 2 - Maximum Phase Current - Low Byte
Data Byte 3 - Maximum Phase Identification (A, B, C or N), Breaker Identification and Ground Fault Restraint In
Data Byte 4 - Trip Unit/Sensor Identification
Data Byte 5 - Rating Plug/Options Packet 3 - (0 0 1 1)
Data Byte 1 - Long Time Switches
Data Byte 2 - Short Time Switches
Data Byte 3 - Instantaneous Phase Unbalance Switches
Data Byte 4 - Ground Fault Switches
Data Byte 5 - Phase Unbalance Trips Packet 4 - (0 1 0 0)
Data Byte 1 - Long Time Trips
Data Byte 2 - Short Circuit Trips
Data Byte 3 - Ground Fault Trips
Data Byte 4 - Last Maximum Phase Current - High Byte
Data Byte 5 - Last Maximum Phase Current - Low Byte Packet 5 - (0 1 0 1)
Data Byte 1 - Software Failure Trips
Data Byte 2 - Last Phase A Current - High Byte
Data Byte 3 - Last Phase A Current - Low Byte
Data Byte 4 - Last Phase B Current - High Byte
Data Byte 5 - Last Phase B Current - Low Byte Packet 6 - (0 1 1 0)
Data Byte 1 - Last Fault System Status Byte
Data Byte 2 - Last Phase C Current - High Byte
Data Byte 3 - Last Phase C Current - Low Byte
Data Byte 4 - Last Ground Fault Current - High Byte
Data Byte 5 - Last Ground Fault Current - Low Byte Packet 7 - (0 1 1 1)
Data Byte 1 - Long Time Memory Ratio
Data Byte 2 - Phase A % Unbalance
Data Byte 3 - Phase B % Unbalance
Data Byte 4 - Phase C % Unbalance
Data Byte 5 - Software Version Identifier Byte Accordingly, the microcomputer 120 transmits information in four substantive classes. The first class constitutes trip status information, as set forth in the first byte of each packet. The second and third classes involve current measurement information; the second class including current measurement information on each line 106, as set forth in packets 0 and 1, and the third class including the maximum current status information, as set forth in packet 2. The last class of information relates to the present configuration of the tripping system and is contained in packets 3 through 7.

H. Appendices

The attached appendices respectively illustrate the preferred manner in which the microcomputer 120 of FIG. 1 and the display processor 316 of FIG. 3a may be programmed to implement the system as set forth above in the preferred embodiment.

I claim:

1. A tripping system for interrupting a current path, comprising:
    means for interrupting the current path in response to a trip signal;
    a power supply for providing power to the means for interrupting to effect the current path interruption;
    power supply sensing means, coupled to the power supply, for indicating whether or not the power supply is presently capable of supplying the means for interrupting with a sufficient amount of power to effect the current path interruption;
    a current sensor for sensing current in the current path; and
    generation means, responsive to the current sensor and the power supply sensing means, for engaging the means for interrupting when the power supply sensing means indicates that the power supply is presently capable of supplying the means for interrupting with a sufficient amount of power to effect the current path interruption.

2. A tripping system, according to claim 1, wherein the power supply receives current from the current path.

3. A tripping system, according to claim 2, wherein the current sensor includes a coil inductively linked to the current path, and the power supply includes a capacitor charged by current rectified from current induced in the coil.

4. A tripping system, as claimed in claim 1, wherein the generation means includes a processor programmed to determine when the current through the current path has become excessive and input data from the power supply sensing means before engaging the means for interrupting.

5. A tripping system, according to claim 4, wherein the processor further includes means responsive to the fault signal for repeatedly checking the power supply sensing means until the power supply sensing means indicates that the power supply is presently capable of supplying the means for interrupting with a sufficient amount of power to effect the current path interruption.

6. A method of using a solenoid in a fault powered tripping system to interrupt a current path, the method comprising the steps of:
   a) receiving and storing energy from current flowing through the current path;
   b) sensing the amount of current flowing through the current path;
   c) detecting whether said energy having been received and stored is sufficient to engage the solenoid; and
   d) after sensing an excessive amount of current in step b) and detecting in step c) that said energy is sufficient to engage the solenoid, energizing the solenoid to interrupt the current path.

7. A tripping system for interrupting a current path, comprising:
   a sensing circuit for sensing at least one power-related parameter in the current path;
   an interruption circuit for interrupting the current path in response to a trip signal;
   a power control circuit, drawing power from the current path and including at least one power signal, for providing for sufficient power to the interruption circuit to effect the current path interruption;
   a comparison circuit, coupled to the power supply, which indicates if said at least one power signal is greater than a predetermined value; and
   means, including a microcomputer for analyzing said at least one power-related parameter, for engaging the interruption circuit in response to the analysis of said at least one power-related parameter and to the comparison circuit indicating that said at least one power signal is greater than a predetermined value.

8. A tripping system, according to claim 7, wherein the comparison circuit includes a digital buffer which generates a logic low when said at least one power signal falls below said predetermined value.

9. A tripping system for interruption at least one of a plurality of current paths in a multi-phase network, said tripping system comprising:
   a plurality of sensing circuits for sensing current in each of the plurality of current paths;
   a plurality of rectification circuits, respectively coupled to said rectification circuits;
   a power control circuit, drawing power from the current path through said plurality of rectification circuits, said power control circuit providing sufficient power to the interruption circuit to effect the current path interruption;
   at least one burden resistor coupled between the power control circuit and at least one of said plurality of rectification circuits for developing a voltage signal which corresponds to said at least one power-related parameter in at least one of the current paths;
   at least two amplification circuits, arranged in parallel so that both receive said voltage signal and each having a different gain for amplifying said voltage signal so as to amplify the voltage signal in varying degrees of resolution;
   an interruption circuit for interrupting the current path in response to a trip signal;
   a comparison circuit, coupled to the power supply, which indicates if said at least one power signal is greater than a predetermined value; and
   means, including a microcomputer for analyzing said voltage signal through said at least two amplification circuits, for engaging the interruption circuit in response to the analysis of said at least one power-related parameter and in response to the comparison circuit indicating that said at least one power signal is greater than a predetermined value.

* * * * *